(12) United States Patent
Montgomery et al.

(10) Patent No.: US 10,787,203 B2
(45) Date of Patent: Sep. 29, 2020

(54) HYBRID ENERGY STORAGE AND DELIVERY DEVICES FOR HYBRID ELECTRIC VEHICLES

(71) Applicant: FORD GLOBAL TECHNOLOGIES, LLC, Dearborn, MI (US)

(72) Inventors: Kevin A. Montgomery, Royal Oak, MI (US); Hari Krishna Addanki, Novi, MI (US); Patrick Daniel Maguire, Ann Arbor, MI (US); Keith Kearney, Grosse Ile, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/860,950

(22) Filed: Jan. 3, 2018

(65) Prior Publication Data

US 2019/0202500 A1 Jul. 4, 2019

(51) Int. Cl.
| | | |
|---|---|---|
| *B60K 1/04* | (2019.01) |
| *B62D 21/16* | (2006.01) |
| *H01M 2/02* | (2006.01) |
| *B60K 6/28* | (2007.10) |
| *B60K 15/063* | (2006.01) |
| *B62D 21/03* | (2006.01) |

(Continued)

(52) U.S. Cl.
CPC ............. *B62D 21/16* (2013.01); *B60K 1/04* (2013.01); *B60K 6/28* (2013.01); *B60K 15/063* (2013.01); *B62D 21/03* (2013.01); *B62D 25/20* (2013.01); *H01M 2/0237* (2013.01); *B60K 2001/0405* (2013.01); *B60K 2015/03105* (2013.01); *B60K 2015/03118* (2013.01); *B60Y 2200/92* (2013.01); *B62D 21/15* (2013.01)

(58) Field of Classification Search
CPC .... B62D 21/16; B60K 15/063; B60K 15/073; B60K 2015/03032; B60K 2015/03105; B60K 2015/03177; B60K 2015/0319; B60K 2015/03493; B60K 1/04; B60K 6/28; B60K 2001/0405; H01M 2/00; H01M 2/02; H01M 2/0237; H01M 2/04; H01M 2/1083
See application file for complete search history.

(56) References Cited

U.S. PATENT DOCUMENTS

| | | | | |
|---|---|---|---|---|
| 4,013,300 A | * | 3/1977 | Berger | B60K 15/00 180/68.5 |
| 6,179,145 B1 | * | 1/2001 | Roth | B60K 15/03 220/4.13 |

(Continued)

FOREIGN PATENT DOCUMENTS

| | | | | |
|---|---|---|---|---|
| DE | 1087028 B | * | 8/1960 | B60K 15/00 |
| DE | 102012022945 A1 | * | 8/2013 | B60K 15/03 |

(Continued)

*Primary Examiner* — Steve Clemmons
(74) *Attorney, Agent, or Firm* — David B. Kelley; Carlson, Gaskey & Olds

(57) ABSTRACT

A hybrid energy storage and delivery device includes a plastic enclosure that establishes a first sealed chamber and a second sealed chamber. The first sealed chamber is configured as a fuel tank for storing a liquid fuel and the second sealed chamber is configured as a battery pack for storing electrical energy. Thus, the fuel tank and battery pack may be integrated together within a single enclosure in order to improve vehicle packaging efficiencies.

20 Claims, 3 Drawing Sheets

(51) Int. Cl.
    *B62D 25/20*     (2006.01)
    *B60K 15/03*     (2006.01)
    *B62D 21/15*     (2006.01)

(56) References Cited

U.S. PATENT DOCUMENTS

| | | | |
|---|---|---|---|
| 6,223,526 B1 * | 5/2001 | Wissler | B60K 15/03 |
| | | | 60/286 |
| 6,661,339 B2 * | 12/2003 | Muirhead | B29C 51/267 |
| | | | 220/562 |
| 7,232,156 B2 | 6/2007 | Rife et al. | |
| 7,913,788 B1 | 3/2011 | Bryer et al. | |
| 9,499,205 B1 | 11/2016 | Elia et al. | |
| 9,537,124 B2 * | 1/2017 | Stanek | H01M 2/1077 |
| 9,944,173 B2 * | 4/2018 | Ajisaka | B60K 13/04 |
| 2008/0000703 A1 | 1/2008 | Shindou | |
| 2011/0272414 A1 * | 11/2011 | Gaden | B60K 13/04 |
| | | | 220/564 |
| 2012/0141841 A1 * | 6/2012 | Rich | H01M 16/006 |
| | | | 429/9 |
| 2015/0210159 A1 * | 7/2015 | Maguin | F01N 3/2066 |
| | | | 60/295 |
| 2016/0200189 A1 * | 7/2016 | De Keyzer | B60K 15/03177 |
| | | | 220/562 |
| 2018/0328324 A1 * | 11/2018 | Yaccarino | F02M 37/10 |
| 2018/0351288 A1 * | 12/2018 | Leonard | B60K 13/04 |
| 2019/0184815 A1 * | 6/2019 | Nagel | B60K 15/03177 |

FOREIGN PATENT DOCUMENTS

| | | | | |
|---|---|---|---|---|
| EP | 1577143 A1 * | 9/2005 | | B60K 15/063 |
| JP | 2012148749 A | 8/2012 | | |
| KR | 20080003495 A * | 1/2008 | | |
| WO | 2011/135270 A1 | 11/2011 | | |

\* cited by examiner

HYBRID ENERGY STORAGE AND DELIVERY DEVICES FOR HYBRID ELECTRIC VEHICLES

TECHNICAL FIELD

This disclosure relates to hybrid electric vehicle energy storage devices that can store and deliver both liquid fuel and electrical energy.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

Hybrid electric vehicles are a common type of electrified vehicle. Hybrid electric vehicles include an electric motor that is electrically powered by a high voltage battery pack and an internal combustion engine that is powered by liquid fuel stored within a fuel tank. The battery pack and the fuel tank are typically packaged separately from one another on the hybrid electric vehicle. Packaging these components separately reduces the amount of available cargo volume and can negatively impact passenger comfort.

SUMMARY

A hybrid energy storage and delivery device according to an exemplary aspect of the present disclosure includes, among other things, a plastic enclosure that establishes a first sealed chamber and a second sealed chamber. The first sealed chamber is configured as a fuel tank for storing a liquid fuel and the second sealed chamber is configured as a battery pack for storing electrical energy.

In a further non-limiting embodiment of the foregoing hybrid energy storage and delivery device, the second sealed chamber is disposed below at least a portion of the first sealed chamber.

In a further non-limiting embodiment of either of the foregoing hybrid energy storage and delivery devices, the second sealed chamber is disposed above at least a portion of the first sealed chamber.

In a further non-limiting embodiment of any of the foregoing hybrid energy storage and delivery devices, the second sealed chamber is disposed axially between a first section and a second section of the first sealed chamber.

In a further non-limiting embodiment of any of the foregoing hybrid energy storage and delivery devices, a crossover section connects between the first section and the second section of the first sealed chamber.

In a further non-limiting embodiment of any of the foregoing hybrid energy storage and delivery devices, the first sealed chamber and the second sealed chamber share a common wall of the plastic enclosure.

In a further non-limiting embodiment of any of the foregoing hybrid energy storage and delivery devices, the second sealed chamber houses a battery array and a battery electronic component.

In a further non-limiting embodiment of any of the foregoing hybrid energy storage and delivery devices, a bottom wall of the first sealed chamber is flat and establishes a footprint for forming the second sealed chamber.

In a further non-limiting embodiment of any of the foregoing hybrid energy storage and delivery devices, a hybrid electric vehicle includes the hybrid energy storage and delivery device.

In a further non-limiting embodiment of any of the foregoing hybrid energy storage and delivery devices, the hybrid energy storage and delivery device is suspended from an underbody of the hybrid electric vehicle.

In a further non-limiting embodiment of any of the foregoing hybrid energy storage and delivery devices, the hybrid energy storage and delivery device is mounted horizontally between a first frame rail and a second frame rail and is mounted vertically between a floor pan and an exhaust pipe.

A method according to another exemplary aspect of the present disclosure includes, among other things, packaging a fuel tank and a battery pack of a hybrid electric vehicle together within a single plastic enclosure.

In a further non-limiting embodiment of the foregoing method, the single plastic enclosure includes a first sealed chamber that acts as the fuel tank and a second sealed chamber that acts as the battery pack.

In a further non-limiting embodiment of either of the foregoing methods, the method includes welding together a first plastic piece and a second plastic piece to establish the first sealed chamber, and welding a third plastic piece to the second plastic piece to establish the second sealed chamber.

In a further non-limiting embodiment of any of the foregoing methods, the first plastic piece establishes an upper surface of the fuel tank, the second plastic piece establishes a lower surface of the fuel tank and an upper surface of the battery pack, and the third plastic piece establishes a lower surface of the battery pack.

In a further non-limiting embodiment of any of the foregoing methods, the method includes forming the first sealed chamber using a first plastic piece and welding a second plastic piece to a first plastic piece to establish the second sealed chamber.

In a further non-limiting embodiment of any of the foregoing methods, the first plastic piece establishes an upper surface of the fuel tank, a lower surface of the fuel tank, and an upper surface of the battery pack, and the second plastic piece establishes a lower surface of the battery pack.

In a further non-limiting embodiment of any of the foregoing methods, the fuel tank is positioned at least partially above the battery pack.

In a further non-limiting embodiment of any of the foregoing methods, the fuel tank is positioned at least partially below the battery pack.

In a further non-limiting embodiment of any of the foregoing methods, the fuel tank is positioned on each outboard side of the battery pack.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary hybrid energy storage and delivery devices that can store and deliver both liquid fuel and electrical energy within hybrid electric vehicles. An exemplary hybrid energy storage and delivery device includes a plastic enclosure that establishes a first sealed chamber and a second sealed chamber. The first sealed chamber is configured as a fuel tank for storing a liquid fuel, and the second sealed chamber is configured as a battery pack for storing electrical energy. Thus, the fuel tank and battery pack are integrated together within a single plastic enclosure in order to improve vehicle packaging efficiencies. These and other features of this disclosure are described in greater detail below.

Figure 1:
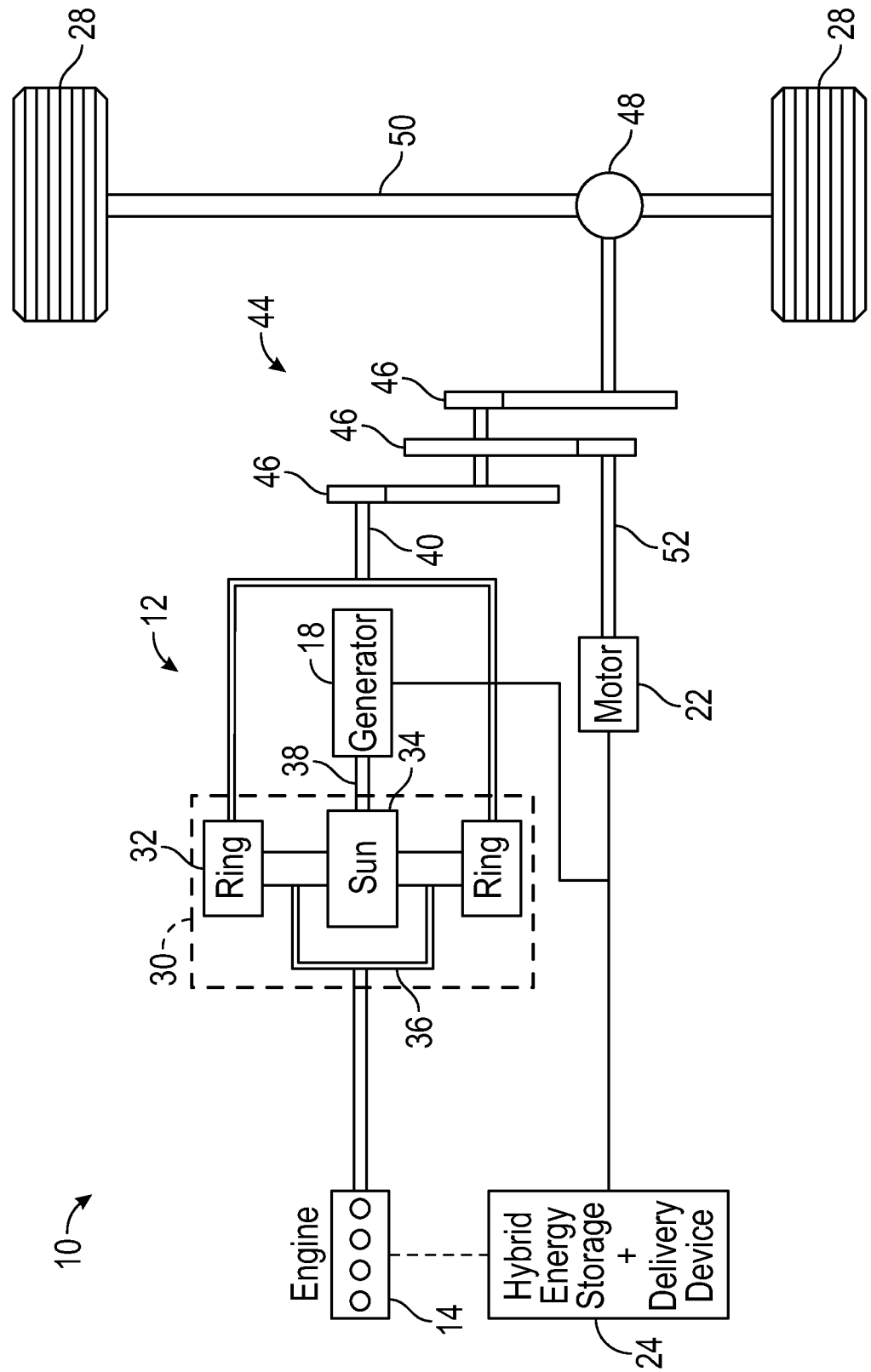
FIG. 1 schematically illustrates a powertrain of a hybrid electric vehicle.

FIG. 1 schematically illustrates a powertrain 10 for an electrified vehicle 12. In an embodiment, the electrified vehicle 12 is a hybrid electric vehicle (HEV). In another embodiment, the electrified vehicle is a plug-in hybrid electric vehicle (PHEV). The teachings of this disclosure could extend to any type of electrified vehicle that employs two or more energy sources (e.g., liquid fuel, battery, etc.) for powering vehicle propulsion.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a hybrid energy storage and delivery device 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In an embodiment, the motor 22 and the generator 18 cooperate as part of a regenerative braking system in which both the motor 22 and the generator 18 can be employed as motors to output torque. For example, the motor 22 and the generator 18 can each output electrical power to the hybrid energy storage and delivery device 24.

The hybrid energy storage and delivery device 24 stores at least two different energy sources for powering the electrified vehicle 12. In an embodiment, the hybrid energy storage and delivery device 24 stores both liquid fuel (e.g., gasoline) for powering the engine 14 and electrical energy (e.g., battery power) for powering the motor 22, the generator 18, and/or other electrical loads of the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the stored electrical energy of the hybrid energy storage and delivery device 24 up to its maximum allowable discharging rate under certain driving patterns/cycles. The EV mode is an example of a charge depleting mode of operation for the electrified vehicle 12. During EV mode, the stored electrical energy of the hybrid energy storage and delivery device 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for achieving vehicle propulsion. The HEV mode is an example of a charge sustaining mode of operation for the electrified vehicle 12. During the HEV mode, the electrified vehicle 12 may reduce the motor 22 propulsion usage in order to maintain the amount of stored electrical energy of the hybrid energy storage and delivery device 24 at a constant or approximately constant level by increasing the engine 14 propulsion. The electrified vehicle 12 may be operated in other operating modes in addition to the EV and HEV modes within the scope of this disclosure.

Figure 2:
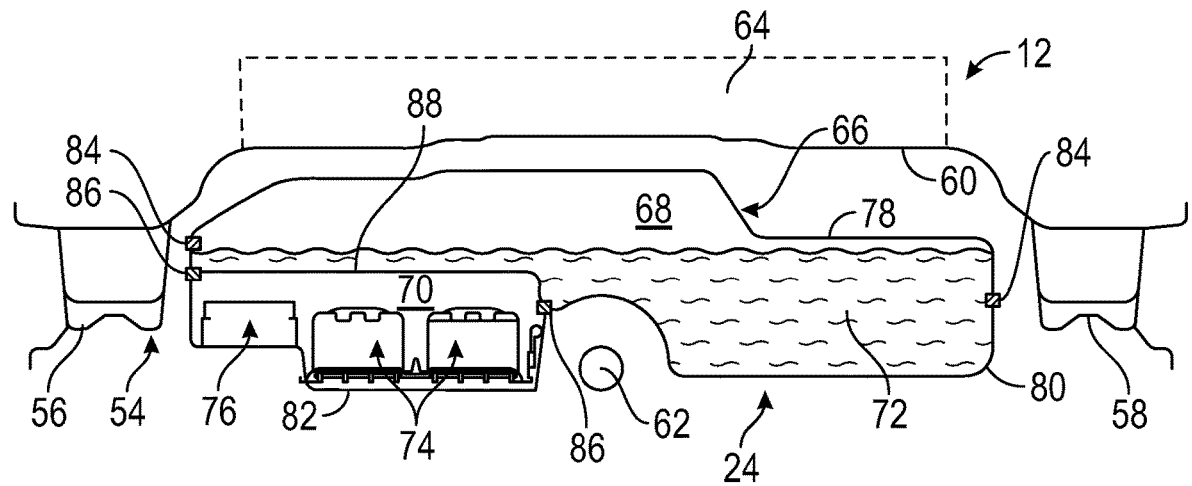
FIG. 2 illustrates a hybrid energy storage and delivery device according to a first embodiment of this disclosure.

FIG. 2 illustrates an exemplary hybrid energy storage and delivery device 24 that can be employed by the electrified vehicle 12. The hybrid energy storage and delivery device 24 is mounted to an underbody 54 of the electrified vehicle 12 using any conventional mounting technique. Once mounted, the hybrid energy storage and delivery device 24 is suspended from the underbody 54 and is positioned outside of the passenger compartment of the electrified vehicle 12.

The hybrid energy storage and delivery device 24 may be mounted in the space typically reserved for the fuel tank of the electrified vehicle 12. In an embodiment, the hybrid energy storage and delivery device 24 is disposed horizontally between a first frame rail 56 and a second frame rail 58 of the underbody 54. The first frame rail 56 and the second frame rail 58 extend longitudinally (i.e., into the page in FIG. 2) to establish a length of the underbody 54. The hybrid energy storage and delivery device 24 may also be disposed vertically between a floor pan 60 of the underbody 54 and exhaust piping 62. The exhaust piping 62 may be part of an exhaust system of the electrified vehicle 12. In another embodiment, the hybrid energy storage and delivery device 24 is mounted beneath a rear seat 64 (shown schematically) of the electrified vehicle 12. Other mounting locations are also contemplated, and it should be understood that the illustrated mounting location of the hybrid energy storage and delivery device 24 is not intended to limit this disclosure.

The hybrid energy storage and delivery device 24 includes a plastic enclosure 66 that houses multiple energy sources. The plastic enclosure 66 can be constructed of a variety of polymeric materials. In a first embodiment, the plastic enclosure 66 is made of high density polyethylene (HDPE). In a second embodiment, the plastic enclosure 66 is made of polypropylene. In a third embodiment, the plastic enclosure 66 is made of polyamide. In yet another embodiment, the plastic enclosure 66 is made of a plastic material that is filled with reinforcements, such as continuous or discontinuous glass or carbon fibers, for example.

The hybrid energy storage and delivery device 24 may include a first sealed chamber 68 and a second sealed chamber 70 that is fluidly isolated from the first sealed chamber 68. In this embodiment, the first sealed chamber 68 stores a liquid fuel 72 and therefore acts as a fuel tank of the hybrid energy storage and delivery device 24, and the second sealed chamber 70 stores electrical energy and therefore acts as a battery pack of the hybrid energy storage and delivery device 24. That is, the hybrid energy storage and delivery device 24 integrates the fuel tank and the battery pack together within a single plastic enclosure unit.

Although not shown in the schematic depiction of FIG. 2, the first sealed chamber 68 may also house the fuel sending unit and all other necessary components for fuel level sensing and delivery of the liquid fuel 72.

A plurality of battery components may be housed within the second sealed chamber 70. For example, the second sealed chamber 70 may house one or more battery arrays 74 (e.g., groupings of battery cells including any array structures such as array frames, spacers, rails, walls, plates, bindings, heat exchanger plates, etc.) and one or more battery electronic components 76 (e.g., battery electric control module (BECM), bussed electrical center (BEC), service disconnects, etc.).

In an embodiment, the plastic enclosure 66 is a unitary, monolithic structure that is formed by welding or otherwise bonding together a first plastic piece 78, a second plastic piece 80, and a third plastic piece 82 (i.e., a three-piece design). For example, the first plastic piece 78 and the second plastic piece 80 can be joined together by a first weld seam 84, and the third plastic piece 82 can be joined to the second plastic piece 80 by a second weld seam 86.

Once bonded, the first plastic piece 78 and the second plastic piece 80 establish the first sealed chamber 68, and the second plastic piece 80 and the third plastic piece 82 establish the second sealed chamber 70. More particularly, in this embodiment, the first plastic piece 78 establishes a fuel tank upper surface, the second plastic piece 80 establishes a fuel tank lower surface and a battery pack upper surface, and the third plastic piece 82 establishes a battery pack lower surface. Notably, a portion 88 (drawn using hatched lines for clarity) of the second plastic piece 80 acts as a shared wall between the fuel tank and battery pack portions of the hybrid energy storage and delivery device 24. Therefore, no gaps, mechanical fastenings devices, or separate walls are disposed between the fuel tank and battery pack portions of the hybrid energy storage and delivery device 24. That is, the first sealed chamber 68 and the second sealed chamber 70 share a common wall for improved packaging efficiency.

Figure 3:
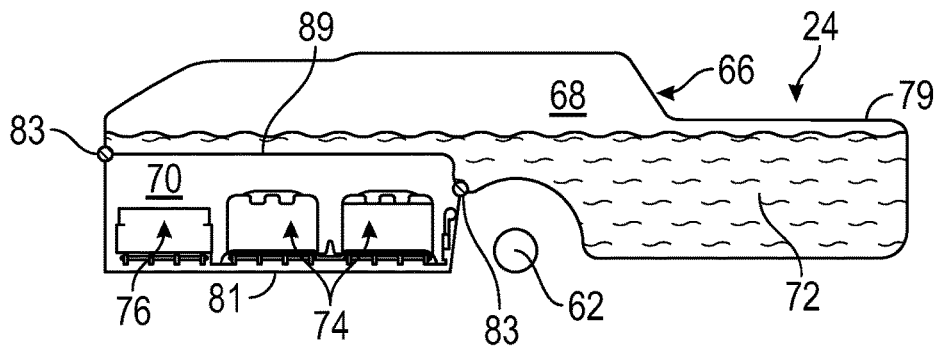
FIG. 3 illustrates a hybrid energy storage and delivery device according to a second embodiment of this disclosure.

In an alternative embodiment, shown in FIG. 3, the plastic enclosure 66 is a unitary, monolithic structure that is formed be welding or otherwise boding together a first plastic piece 79 and a second plastic piece 81 (i.e., a two-piece design). The first plastic piece 79 and the second plastic piece 81 can be joined together by a single weld seam 83.

Once bonded, the first plastic piece 79 establishes the first sealed chamber 68, and both the first plastic piece 79 and the second plastic piece 81 establish the second sealed chamber 70. More particularly, in this embodiment, the first plastic piece 79 establishes each of the fuel tank upper surface, the fuel tank lower surface, and the battery pack upper surface, and the second plastic piece 81 establishes the battery pack lower surface. Notably, a portion 89 (drawn with hatched lines for clarity) of the first plastic piece 79 acts as a shared wall between the fuel tank and battery pack portions of the hybrid energy storage and delivery device 24. Therefore, no gaps, mechanical fastenings devices, or separate walls are disposed between the fuel tank and battery pack portions of the hybrid energy storage and delivery device 24.

Figure 4:
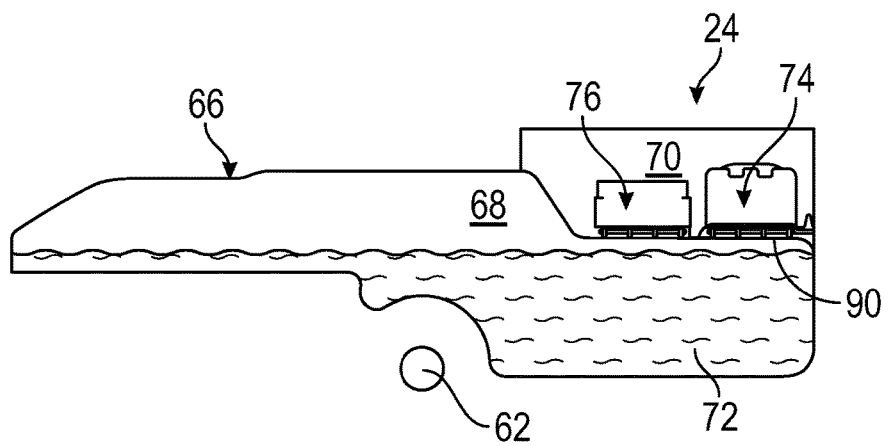
FIG. 4 illustrates a hybrid energy storage and delivery device according to a third embodiment of this disclosure.

In FIGS. 2 and 3, the battery pack portion (i.e., the second sealed chamber 70) of the hybrid energy storage and delivery device 24 is mounted beneath at least a portion of the fuel tank portion (i.e., the first sealed chamber 68). However, other configurations are additionally contemplated within the scope of this disclosure. Referring to FIG. 4, for example, the second sealed chamber 70 of the plastic enclosure 66 may be positioned above at least a portion of the first sealed chamber 68 such that battery pack portion is at least partially above the fuel tank portion of the hybrid energy storage and delivery device 24. In this embodiment, a portion 90 (drawn using hatched lines for clarity) of the fuel tank upper surface acts as the shared wall between the second sealed chamber 70 and the first sealed chamber 68. Positioning portions of the fuel tank of the hybrid energy storage and delivery device 24 below the battery pack positions the fuel tank closer to the exhaust piping 62. The liquid fuel 72 has a relatively large heat capacity and thus effectively insulates the battery components housed in the second sealed chamber 70 from any radiated heat produced by the exhaust system.

Figure 5:
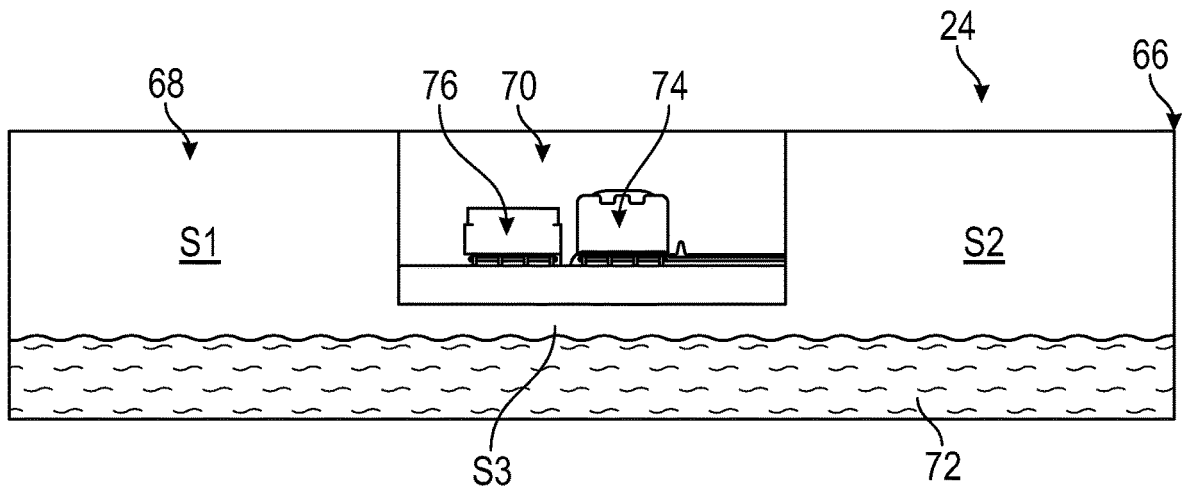
FIG. 5 illustrates a hybrid energy storage and delivery device according to a fourth embodiment of this disclosure.

In yet another embodiment, shown in FIG. 5, the second sealed chamber 70 of the plastic enclosure 66 is positioned axially between a first section Si and a second section S2 of the first sealed chamber 68 such that fuel tank portions are disposed on either outboard side of the battery pack portion of the hybrid energy storage and delivery device 24. A third section S3 of the first sealed chamber 68 may connect between the first section 51 and the second section S2. The third section S3 therefore acts as a crossover portion that allows the liquid fuel 72 to be displaced between the first and second sections 51, 52. This particular embodiment allows the flexible plastic enclosure 66 and the displaceable liquid fuel 72 contained within the first sealed chamber 68 to yield to any side crash deforming structures without applying any concentrated loads to the battery components housed within the second sealed chamber 70.

Figure 6:
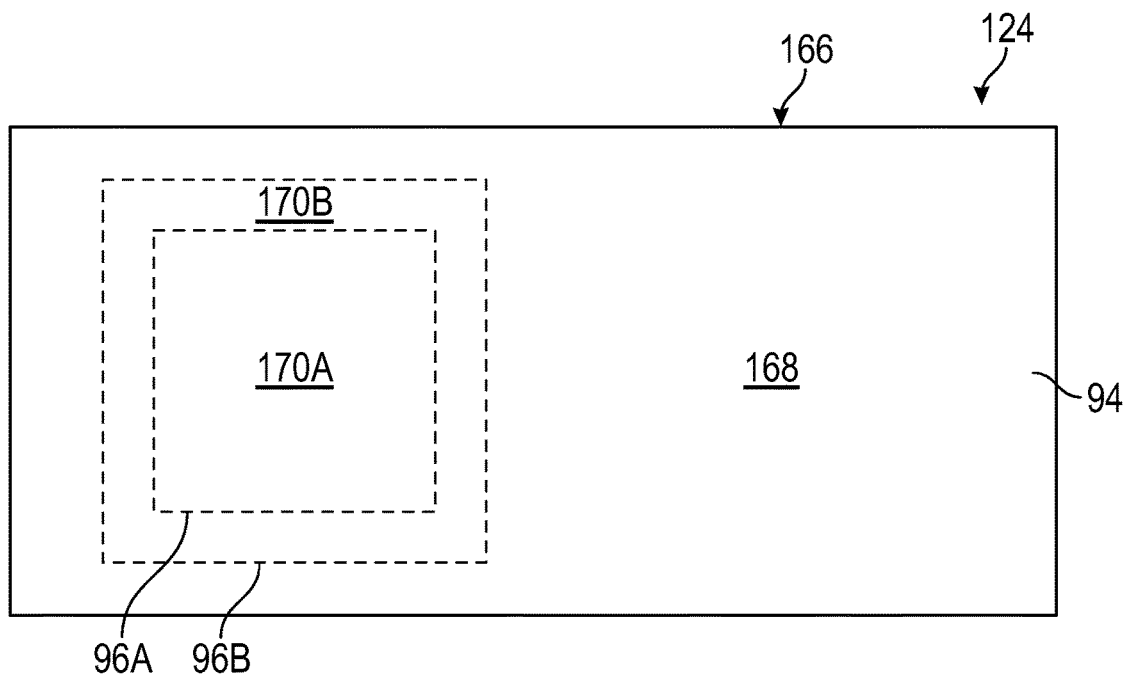
FIG. 6 is a bottom view of yet another exemplary hybrid energy storage and delivery device.

FIG. 6 illustrates another exemplary hybrid energy storage and delivery device 124 for storing multiple energy sources within a single plastic enclosure 166. The plastic enclosure 166 may establish a first sealed chamber 168 and a second sealed chamber 170 that is fluidly isolated from the first sealed chamber 168. In this embodiment, the first sealed chamber 168 stores a liquid fuel and therefore acts as a fuel tank of the hybrid energy storage and delivery device 124, and the second sealed chamber 170 stores electrical energy and therefore acts as a battery pack of the hybrid energy storage and delivery device 124.

In an embodiment, a bottom wall 94 of the first sealed chamber 168 of the plastic enclosure 166 is a substantially flat surface. The bottom wall 94 provides a mounting surface for accommodating battery pack portions of different sizes. Different sized battery pack portions may be desirable to accommodate the different electrical energy storage requirements demanded by HEVs as compared to PHEVs, for example. In an embodiment, an additional plastic piece 96A can be welded or otherwise bonded to the bottom wall 94 to establish a second sealed chamber 170A of a first size, and an additional plastic piece 96B can be welded or otherwise bonded to the bottom wall 94 to establish a second sealed chamber 170B of a second size. Therefore, the bottom wall 94 provides the necessary footprints for establishing differently sized battery portions of the hybrid energy storage and delivery device 124.

The hybrid energy storage and delivery devices of this disclosure improve packaging efficiencies within hybrid electric vehicles by integrating the fuel tank and battery together within a single enclosure. Packaging efficiencies are improved by eliminating clearance gaps between the battery and the fuel tank portions of the hybrid device. The proposed designs also reduce weight, cost, and end item part complexity. In addition, because the proposed hybrid energy storage and delivery devices can be packaged in the areas typically designated for the fuel tank, occupant comfort and cargo volume are not negatively impacted.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A hybrid energy storage and delivery device, comprising:
a plastic enclosure that establishes a first sealed chamber and a second sealed chamber;
the first sealed chamber is configured as a fuel tank for storing a liquid fuel; and
the second sealed chamber is configured as a battery pack for storing electrical energy,
wherein the second sealed chamber houses a battery array and a battery electronic component,
wherein the battery array and the battery electronic component are both received directly against a surface of the plastic enclosure that at least partially establishes the second sealed chamber.

2. The hybrid energy storage and delivery device as recited in claim 1, wherein the second sealed chamber is disposed below at least a portion of the first sealed chamber.

3. The hybrid energy storage and delivery device as recited in claim 1, wherein the second sealed chamber is disposed above at least a portion of the first sealed chamber.

4. The hybrid energy storage and delivery device as recited in claim 1, wherein an entirety of the second sealed chamber is disposed axially between a first section and a second section of the first sealed chamber.

5. The hybrid energy storage and delivery device as recited in claim 4, comprising a crossover section that connects between the first section and the second section of the first sealed chamber.

6. The hybrid energy storage and delivery device as recited in claim 1, wherein the first sealed chamber and the second sealed chamber share a common wall of the plastic enclosure.

7. The hybrid energy storage and delivery device as recited in claim 1, wherein an entirety of a bottom wall of the first sealed chamber is flat and establishes a footprint for forming the second sealed chamber.

8. The hybrid energy storage and delivery device as recited in claim 1, wherein the plastic enclosure consists of a first plastic piece, a second plastic piece, and a single weld seam that joins the first plastic piece and the second plastic piece together.

9. The hybrid energy storage and delivery device as recited in claim 1, wherein the plastic enclosure consists of a first plastic piece, a second plastic piece, a third plastic piece, a first weld seam that joins the first plastic piece and the second plastic piece together, and a second weld seam that joins the third plastic piece to the second plastic piece.

10. The hybrid energy storage and delivery device as recited in claim 1, wherein the first sealed chamber and the second sealed chamber are both single-walled structures.

11. A hybrid electric vehicle, comprising:
a hybrid energy storage and delivery device including:
a plastic enclosure that establishes a first sealed chamber and a second sealed chamber;
the first sealed chamber is configured as a fuel tank for storing a liquid fuel; and
the second sealed chamber is configured as a battery pack for storing electrical energy,
wherein a battery component is received directly against a surface of the plastic enclosure that at least partially establishes the second sealed chamber,
wherein the hybrid energy storage and delivery device is suspended from an underbody of the hybrid electric vehicle,
wherein the hybrid energy storage and delivery device is mounted horizontally between a first frame rail and a second frame rail and is mounted vertically between a floor pan and an exhaust pipe.

12. The hybrid electric vehicle as recited in claim 11, wherein the hybrid energy storage and delivery device is mounted beneath a rear seat of the hybrid electric vehicle.

13. A method, comprising:
packaging a fuel tank and a battery pack of a hybrid electric vehicle together within a single plastic enclosure,
wherein the single plastic enclosure includes a first sealed chamber that establishes the fuel tank and a second sealed chamber that establishes the battery pack,
wherein the second sealed chamber houses a battery array and a battery electronic component,
wherein the battery array and the battery electronic component are both received directly against a surface of the single plastic enclosure that at least partially establishes the second sealed chamber.

14. The method as recited in claim 13, comprising:
welding together a first plastic piece and a second plastic piece to establish the first sealed chamber; and
welding a third plastic piece to the second plastic piece to establish the second sealed chamber.

15. The method as recited in claim 14, wherein the first plastic piece establishes an upper surface of the fuel tank, the second plastic piece establishes a lower surface of the fuel tank and an upper surface of the battery pack, and the third plastic piece establishes a lower surface of the battery pack.

16. The method as recited in claim 13, comprising:
forming the first sealed chamber using a first plastic piece; and
welding a second plastic piece to the first plastic piece to establish the second sealed chamber.

17. The method as recited in claim 16, wherein the first plastic piece establishes an upper surface of the fuel tank, a lower surface of the fuel tank, and an upper surface of the battery pack, and the second plastic piece establishes a lower surface of the battery pack.

18. The method as recited in claim 13, wherein the fuel tank is positioned at least partially above the battery pack.

19. The method as recited in claim 13, wherein the fuel tank is positioned at least partially below the battery pack.

20. The method as recited in claim 13, wherein the fuel tank is positioned on each outboard side of the battery pack.

* * * * *